3,259,625
POLYMERIZATION OF ISOCYANATES
Ivar Ugi, Leverkusen, Christian Wiegand, Wuppertal-Elberfeld, and Erwin Müller and Helmut Walz, Leverkusen, Germany, assignors to Farbenfabriken Bayer Aktiengesellschaft, Leverkusen, Germany, a German corporation
No Drawing. Filed June 4, 1963, Ser. No. 285,239
Claims priority, application Germany, June 5, 1962,
F 36,989
10 Claims. (Cl. 260—248)

This invention relates to isocyanates and more particularly to a novel process for the production of isocyanurates.

It is known to produce isocyanurates by the trimerization of isocyanates using various basic catalysts such as tertiary amines and alkali metal salts of carboxylic acids. A number of these processes require relatively high temperatures of reaction before the desired degree of trimerization occurs. When the desired degree of trimerization or polymerization has occurred in these processes, the cyanurate formation is stopped and the catalyst deactivated by the addition of an acid to a reaction mixture. Upon addition of this acid, a salt usually forms in the reaction mixture which, if allowed to remain, can cause serious problems in the final isocyanurate product.

It is known to use condensation products of primary amines with an excess of aliphatic aldehydes as reaction accelerators for the cure of uncured elastomeric diisocyanate and modified polyesters. The cure is done with a further amount of polyisocyanate as curing agent. The amine/aldehyde/condensation products accelerate the reaction between the NCO groups of the polyisocyanate and the urethane, urea or amide linkages present along the molecular chains in the modified polyester. The present invention, however, is concerned with the polymerization of isocyanates that is with the reaction of three NCO groups to form an isocyanurate ring.

It is therefore, an object of this invention to provide a novel process for producing isocyanurates which is devoid of the foregoing disadvantages. Another object of this invention is to provide a novel process for the trimerization of isocyanates without the formation of undesirable salts. Still another object of this invention is to provide a method for the manufacture of isocyanurates without requiring the use of elevated temperatures. Still a further object of this invention is to provide a novel process for the trimerization of isocyanates to isocyanurates whereby the catalyst used may be deactivated without the formation of undesirable by-products.

The foregoing objects and others which will become apparent from the following description are accomplished in accordance with this invention, generally speaking, by providing a process for the trimerization of organic isocyanates which comprises carrying out the trimerization in the presence of at least a catalytic amount of a catalyst obtained by the condensation of a primary amine with an aliphatic or aralphatic carbonyl compound having a methylene group attached directly to the carbonyl group. By the present invention, the condensation products of primary amines with the carbonyl compounds as hereinafter described catalyzes the conversion of isocyanates into isocyanurates even at room temperature. After the desired degree of trimerization, the catalyst can be deactivated by addition reactions without the simultaneous formation of salts. The presence of oxygen increases the activity of the catalyst and therefore is sometimes desirable. The reaction may be carried out at temperatures above about 0° C. in any organic solvent which is inert to —NCO groups.

The catalysts of the present invention are formed by the reaction of primary amines with any suitable aliphatic or aralphatic carbonyl compounds having a methylene group directly attached to the carbonyl group. These carbonyl compounds, for example, may be aliphatic or aralphatic aldehydes or ketones or mixtures thereof. The catalyst, therefore, is the condensation product of these carbonyl compounds with primary amines and are generally prepared by heating the components in the presence of acid or basic catalysts. The water of reaction, which is formed during the condensation processes, may be continuously distilled from the reaction medium. The condensation reaction proceeds via the formation of α,β-unsaturated aldehydes or ketones and the Schiff's bases as the intermediates.

Any suitable aliphatic or aralphatic carbonyl compound having a methylene group attached directly to the carbonyl group may be used to prepare the catalyst above defined. The following are typical carbonyl compounds and derivatives thereof which react as such under the aforementioned reaction conditions: acetaldehyde, propionaldehyde, n-butyraldehyde, aldol, crotonaldehyde, isovaleraldehyde, enanthaldehyde, dihydrocinnamaldehyde, glutaric dialdehyde, cyclohexanone, acetylacetone, methoxybutenine, vinyl acetate, dinitro phenyl pyridinium chloride and 4-methylheptane-2,6-dione. Any suitable primary amine may be used together with the above-noted carbonyl compounds, typical primary amines which may be used are n-butylamine, methylamine, propylamine, ethylamine, laurylamine, methylcyclohexylamine, sym. dichloroaniline, toluidine, β-naphthylamine, cyclohexylamine, benzylamine, aniline, p-chloroaniline and m-phenylenediamine. These amine-carbonyl compound condensation products are further described together with their method of preparation in U.S. Patents 1,780,326 and 1,780,334.

The following compound is the preferred catalyst for employment in the process according to the present invention:

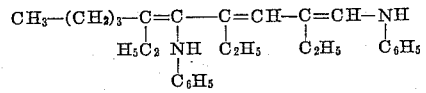

This compound may be prepared by condensing α-ethyl-β-n-propylacrolein with aniline or by the dimerization of the corresponding Schiff's base.

Any amount of catalyst can be used in the present process, however, generally not more than about 5% by weight is added in the trimerization process. The catalyst is preferably employed in an amount of from about 0.05 to about 1.% by weight and is preferably added at a temperature of from about 0° C. to about 100° C. The reaction temperature may be from about 0° C. to about 100° C. or even higher, although it is preferred to carry out the reaction at a temperature of from about 20° C. to about 70° C. until the desired NCO number is attained. The reaction is stopped by deactivating the catalyst by means of a suitable additive. The conversions can also be carried out in solution.

Any suitable aromatic isocyanate can be polymerized by the presently defined process. Typical aromatic isocyanates are phenyl isocyanate, p-tolyl isocyanate, m- and p-phenylene diisocyanates, 2,4- and 2,6-toluylene diisocyanates, 1,5 - naphthylene diisocyanate, 4,4' - diphenyl methane diisocyanate, triphenyl methane-4,4',4''-triisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3-dichloro-4,4'-biphenylene diisocyanate, as well as mixtures thereof. Aliphatic isocyanates such as 1,6-hexane diisocyanate also react in admixture with aromatic isocyanates. Mixtures, therefore, of aromatic and aliphatic isocyanates may be used in the present process.

As solvent, it is possible to employ any organic solvent which does not react with isocyanates, such as methylene chloride, chlorobenzene and acetic acid ethyl ester or the like. The catalyst may be deactivated by means of acids, such as hydrogen cyanide, hydrogen chloride and acetic acid. It is, however, preferable to deactivate the catalyst with a dialkyl phosphite such as dimethyl phosphite or diethyl phosphite.

The products obtained by the process are valuable intermediates and may be used in well-known manner together with high molecular weight polyhydroxyl compounds such as polyesters, polyvinyl formals and the like for lacquer compositions. The products themselves are useful binding agents.

The invention is further illustrated by the following examples in which parts are by weight unless otherwise specified.

Example 1

About 126 parts by weight of $\alpha$-ethyl-$\beta$-n-propyl acrolein and about 93 parts by weight of aniline are reacted in boiling toluene while removing the water of reaction. The reaction mixture is distilled and the fraction boiling at about 150 to 160° C./0.1 mm. Hg is employed as catalyst.

About 0.1 part by weight of the catalyst is added to about 100 parts by weight of a mixture of 2,4- and 2,6-toluylene diisocyanate (70:30) in about 100 parts by weight of dry ethyl acetate while agitating and with access of air. The reaction mixture is heated to about 45 to 50° C. It becomes dark red in color. The reaction is allowed to continue until the NCO-content of the reaction mixture has fallen to about 12.5%. The reaction is stopped by adding diethyl phosphite until the color of the reaction mixture changes from red to pale yellow.

Example 2

107 parts of p-toluidine, 73 parts of n-butylamine, 156 parts of $\alpha,\gamma$-dimethyl-crotonaldehyde, 200 parts of n-hexanal, 20 parts of propionic acid, 100 parts of volume of isopropanol and 50 parts by volume of water are mixed and kept at 80 to 90° for six hours. Volatile material is removed by heating to 90° in vacuo. 1 part of the resulting residue is added to the solution of 100 parts of phenyl isocyanate in 100 parts by volume of ligroin. At 40 to 50° 98 parts of triphenyl isocyanate, M.P. above 300°, separate as colorless crystals.

Example 3

143 parts of $\alpha$-naphthylamine, 300 parts of n-pentanal, 200 parts of acetone, 10 parts of acetic acid and 50 parts of water are stirred at 60 to 70° for 24 hours. The organic layer is washed with water and freed from volatile contaminants by heating to 90 to 100° under reduced pressure. 10 parts of the resulting catalyst are added to the solution of 264 parts diphenylmethane-4,4'-diisocyanate in 500 parts by volume of ligroin/benzene or ligroin/methylene chloride. On standing for six hours at 30 to 40° 248 parts of a light-yellow precipitate with 12 to 14 percent NCO groups is formed.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the trimerization of aromatic isocyanates which comprises carrying out the trimerization in the presence of at least a catalytic amount of a catalyst obtained by the condensation of a primary amine having from 1 to 10 carbon atoms with a carbonyl compound having from 2 to 16 carbon atoms and having a methylene group attached directly to the carbonyl group.

2. The process of claim 1 wherein said carbonyl compound is an aromatic carbonyl compound.

3. The process of claim 1 wherein said carbonyl compound is an araliphatic carbonyl compound.

4. A method for the trimerization of aromatic isocyanates which comprises carrying out the trimerization in the presence of at least a catalytic amount of a catalyst obtained by the condensation of a primary amine having from 1 to 10 carbon atoms with a carbonyl composition having from 2 to 16 carbon atoms selected from the group consisting of aliphatic aldehydes, aliphatic ketones, araliphatic aldehydes, araliphatic ketones and mixtures thereof, said carbonyl composition having a methylene group attached to the carbonyl group.

5. A method of controlling the trimerization of aromatic isocyanates which comprises carrying out the trimerization in the presence of at least a catalytic amount of a catalyst obtained by the condensation of a primary amine having from 1 to 10 carbon atoms with a carbonyl composition having from 2 to 16 carbon atoms selected from the group consisting of aliphatic aldehydes, aliphatic ketones, araliphatic aldehydes, araliphatic ketones and mixtures thereof, said carbonyl composition having a methylene group attached to the carbonyl group, upon obtaining the desired trimerization, deactivating said catalyst with an acid to obtain the desired isocyanate.

6. The process of claim 5 wherein from about 0.01 to about 5% by weight of said catalyst is used.

7. The process of claim 5 wherein said trimerization procedure is carried out at a temperature of from about 0° C. to about 100° C.

8. The process of claim 5 whereby said trimerization is carried out in the presence of an organic solvent, said solvent selected from the group consisting of methylene chloride, chlorobenzene, acetic acid ethyl ester and mixtures thereof.

9. The process of claim 5 wherein said deactivation is effected by the use of an acid selected from the group consisting of hydrogen cyanide, hydrogen chloride, acetic acid, dialkyl phosphite and mixtures thereof.

10. The process of claim 1 wherein the catalyst is obtained by the condensation of $\alpha$-ethyl-$\beta$-n-propyl-acrolein and aniline.

References Cited by the Examiner

UNITED STATES PATENTS 3,179,626   4/1965   Beitchman _____ 260—248

WALTER A. MODANCE, *Primary Examiner.*

JOHN M. FORD, *Assistant Examiner.*

UNITED STATES PATENT OFFICE
CERTIFICATE OF CORRECTION

Patent No. 3,259,625 July 5, 1966

Ivar Ugi et al.

It is hereby certified that error appears in the above numbered patent requiring correction and that the said Letters Patent should read as corrected below.

Column 3, line 39, for "parts of volume" read -- parts by volume --; line 45, for "M.P." read -- m.p. --; column 4, line 40, for "isocyanate" read -- isocyanurate --.

Signed and sealed this 21st day of November 1967.

(SEAL)
Attest:

Edward M. Fletcher, Jr.
Attesting Officer

EDWARD J. BRENNER
Commissioner of Patents